Oct. 12, 1948.  C. SOUTH  2,451,307
CLAMP FOR FRAME STRAIGHTENING MACHINES
Filed April 15, 1947
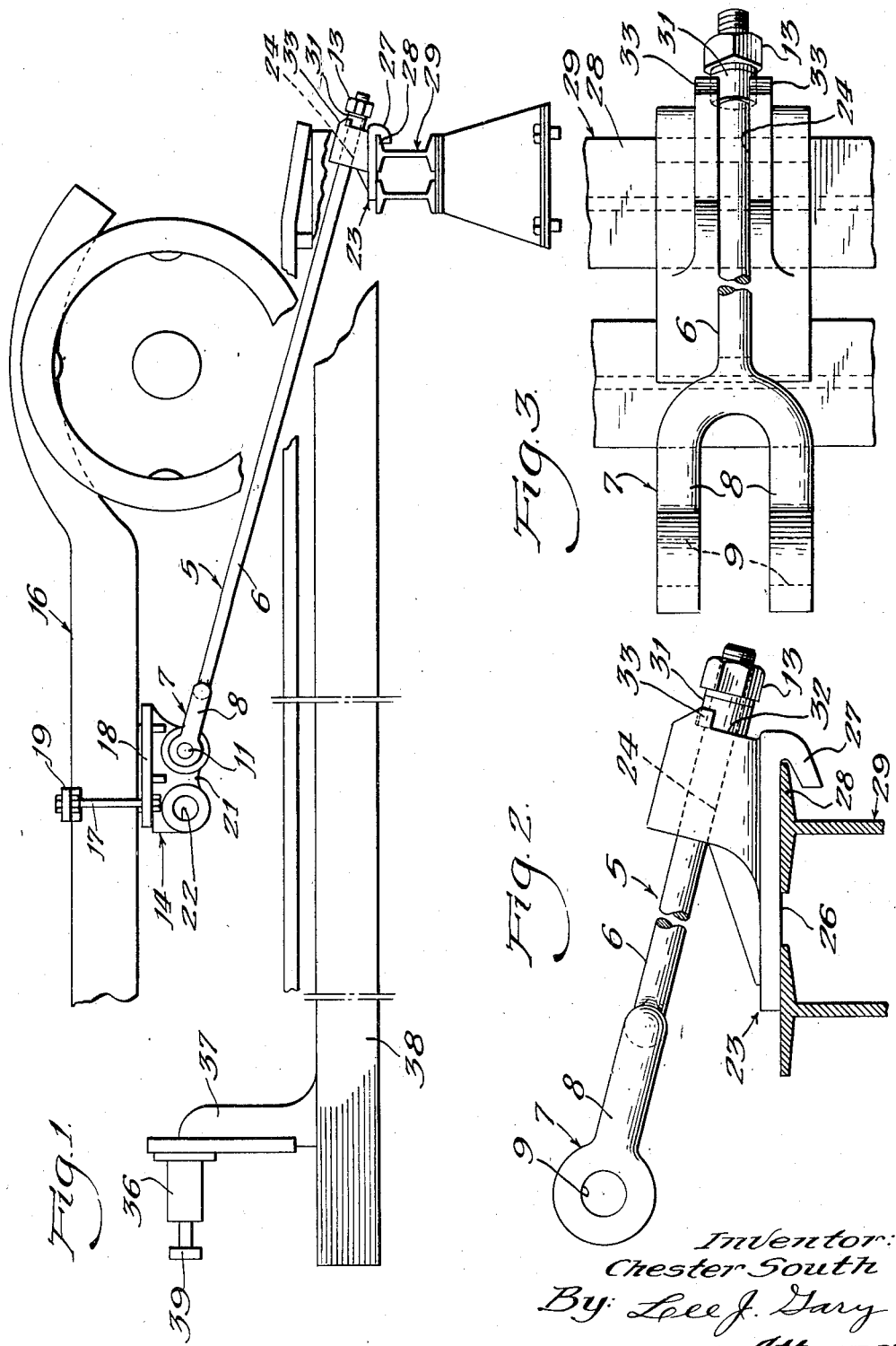
Inventor:
Chester South
By: Lee J. Gary
Attorney Patented Oct. 12, 1948

2,451,307

UNITED STATES PATENT OFFICE 2,451,307

CLAMP FOR FRAME STRAIGHTENING MACHINES

Chester South, Rock Island, Ill., assignor to Bear Manufacturing Company, Rock Island, Ill., a corporation of Delaware Application April 15, 1947, Serial No. 741,582

2 Claims. (Cl. 153—32)

This invention relates to clamps for frame straightening machines, and is more particularly concerned with the provision of a clamping means for securing an automobile frame against forward displacement along a frame straightening machine.

In straightening automobile frames, axles, knee-action units and other parts of automobiles, it is desirable to apply a force in the opposite direction to the force which caused the damage to the automobile. This is often accomplished by securing the frame of an automobile to the frame of a frame straightening machine and then applying a forward pull to the damaged part. It has heretofore been the practice to employ chains for holding an automobile frame in position during a forward pull on the damaged part of the automobile. As a hydraulic jack is employed as a source of power in straightening the damaged parts, it is apparent that a considerable portion of the jack stroke is employed in removing the slack from the restraining chain. It will readily be understood that considerable labor is wasted when it is necessary to adjust the jack several times due to expansion of chain means employed to hold an automobile frame against forward movement.

The present invention contemplates the provision of a clamping means adapted to rigidly secure an automobile frame against forward movement along a frame straightening machine when a forward pull is being applied to damaged parts of an automobile.

This invention further contemplates the provision of a frame clamping means which is relatively simple and inexpensive in construction, reliable in operation and which will not readily get out of order.

This invention further contemplates the provision of a frame clamping means which may readily be adjusted to permit adjustment of an automobile longitudinally along a frame straightening machine and relative to a hydraulic jack and jack stand positioned for engagement with the damaged part of the automobile.

This invention embodied other novel features, details of construction and arrangement of parts which are hereinafter set forth in the specification and claims, and illustrated in the accompanying drawing wherein:

Fig. 1 is a fragmentary side elevational view illustrating the manner in which the clamping means is applied to an automobile frame to hold the latter against a forward pull applied to a damaged part disposed at the front end of the automobile.

Fig. 2 is an enlarged side elevational view showing the clamp.

Fig. 3 is a top plan view of same.

Referring now to the drawings for a better understanding of this invention, the clamp, as generally indicated at 5, is shown as comprising a strain bar 6 which is bifurcated at one end at 7 to provide a pair of spaced parallel arms 8 formed with apertures 9 to receive a pivot pin 11. The opposite end of the strain bar 6 is threaded at 12 to receive an adjustment nut 13.

A frame clamp 14 is adapted to be secured to the frame 16 of an automobile by means of two or more bolts 17. The bolts 17 are disposed on opposite sides of the automobile frame 16 and mounted in apertures provided in the base 18 of the frame clamp 14. The upper ends of the bolts 17 are mounted in spaced apertures provided in a cross bar 19 extending transversely across the top of the automobile frame 16. The frame clamp 14 is provided with a web 21 formed with one or more pivot pin apertures 22 to receive the pivot pin 11. The arms 8 of the strain bar 6 are adapted to straddle the web 21 and to be connected thereto by means of the pivot pin 11.

An abutment bracket 23 is provided with a recess 24 to receive and engage the threaded end of the strain bar 6, and is also provided with a base 26 formed with a hook portion 27 to engage under a flange 28 of a rear stand cross beam 29. One or more spacing collars 31 are provided on the threaded end of the strain bar 6 for engagement between the back face 32 of the abutment bracket 23 and the adjustment nut 13. A pair of lugs 33 extend rearwardly from the back face 32 of the abutment bracket to engage the adjacent spacing collar 31 to prevent upward movement of the threaded end of the strain bar from the recess 24.

A hydraulic jack 36 is secured to a jack stand 37 which is adjustably positioned along the frame 38 of a frame straightening machine in the manner well known in this art. The jack 36 is provided with a plunger 39 for applying a forward pull or push to a damaged part of an automobile to restore the damaged part to its original position or shape. During forward movement of the jack plunger 39 in applying a force in a forward direction to a part of the automobile, it will be noted that the frame 16 of the automobile is securely held against forward movement by the clamp 5.

In the use of the frame clamp 5, it will be noted that the clamp may be applied to either side of the automobile frame 16 and that the abutment bracket 23 may be readily positioned transversely along the rear stand beam 29. After the jack stand 37 has been secured in adjusted position upon the machine frame 38, it may be desirable to provide one or more spacing collars 31 to the threaded end of the strain bar 6; after which, the adjustment nut 13 is tightened until the plunger 39 is in working engagement with the damaged part of the automobile. Hydraulic pressure is then supplied to the jack 36 to move the plunger 39 in a forward direction.

In the use of a clamp of the type shown and described, it will be noted that all the slack is removed from the set-up of the frame straightening machine prior to actuation of the jack plunger 39, thereby converting the entire stroke of the plunger into effective work of straightening the damaged part or parts of the automobile.

While this invention has been shown in but one form, it is obvious to those skilled in the art that it is not so limited but is susceptible of various changes and modifications without departing from the spirit and scope of the claimed invention.

I claim as my invention:

1. In a clamp for use with frame straightening machines embodying side rails and a transverse abutment member, an abutment bracket, a hook portion provided on the outer end of said abutment bracket for detachable engagement with the transverse abutment member of a frame straightening machine, a pair of bosses disposed in spaced relation and projecting upwardly from said abutment bracket to define a recess, a strain bar having its one end threaded and mounted in said recess, a collar slidably mounted on the threaded end of said strain bar for engagement against said bosses, a pair of lugs projecting rearwardly from their respective bosses for engagement with said collar to prevent accidental outward displacement of said strain bar from said recess, an adjustment nut threaded onto said strain bar to move said collar into operative position against said bosses and under said lugs, and a frame clamp pivotally connected to the other end of said strain bar.

2. In a clamp for use with frame straightening machines embodying side rails and a transverse abutment member, an abutment bracket, a hook portion provided on the outer end of said abutment bracket for detachable engagement with the transverse abutment member of a frame straightening machine, a pair of bosses disposed in spaced relation and projecting upwardly from said abutment bracket to define a recess, a strain bar having its one end threaded and mounted in said recess, the other end of said strain bar being bifurcated, a collar slidably mounted on the threaded end of said strain bar for engagement against said bosses, a pair of lugs projecting rearwardly from their respective bosses for engagement with said collar to prevent accidental outward displacement of said strain bar from said recess, an adjustment nut threaded onto said strain bar to move said collar into operative position against said bosses and under said lugs, a frame clamp, means to detachably connect said frame clamp to the frame of an automobile, a web projecting downwardly from said frame clamp, and means to pivotally connect the bifurcated end of said strain bar to said frame clamp web.

CHESTER SOUTH.

REFERENCES CITED

The following references are of record in the file of this patent:

UNITED STATES PATENTS

| Number | Name | Date |
|---|---|---|
| 1,773,187 | Johnson | Aug. 19, 1930 |
| 1,785,923 | Wade | Dec. 23, 1930 |
| 2,059,972 | Smith | Nov. 3, 1936 |
| 2,140,686 | Bennett | Dec. 20, 1938 |